United States Patent
Aruga

(10) Patent No.: US 7,874,680 B2
(45) Date of Patent: Jan. 25, 2011

(54) PROJECTOR THAT DISPLAYS AN IMAGE USING LASER BEAMS

(75) Inventor: Susumu Aruga, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 571 days.

(21) Appl. No.: 11/871,477

(22) Filed: Oct. 12, 2007

(65) Prior Publication Data

US 2008/0111973 A1    May 15, 2008

(30) Foreign Application Priority Data

Nov. 15, 2006   (JP)   .............................. 2006-308726

(51) Int. Cl.
G03B 21/14    (2006.01)

(52) U.S. Cl. .......................... 353/20; 353/85; 359/237; 359/238

(58) Field of Classification Search .................. 353/20, 353/85; 359/237, 238
See application file for complete search history.

(56) References Cited

U.S. PATENT DOCUMENTS

| | | | | |
|---|---|---|---|---|
| 5,363,170 | A * | 11/1994 | Muraki ....................... | 355/67 |
| 5,396,303 | A * | 3/1995 | Peters et al. ................. | 351/221 |
| 6,281,993 | B1 * | 8/2001 | Bernal et al. .................. | 359/29 |
| 7,021,772 | B2 | 4/2006 | Abe et al. | |
| 7,064,880 | B2 * | 6/2006 | Mushika ...................... | 359/237 |
| 7,104,655 | B2 | 9/2006 | Abe et al. | |
| 7,111,946 | B2 | 9/2006 | Abe et al. | |
| 7,111,947 | B2 | 9/2006 | Abe et al. | |
| 7,114,814 | B2 | 10/2006 | Abe et al. | |
| 7,114,815 | B2 | 10/2006 | Abe et al. | |
| 7,163,298 | B2 | 1/2007 | Abe et al. | |
| 7,370,972 | B2 | 5/2008 | Morikawa et al. | |
| 2006/0119803 | A1 | 6/2006 | Abe et al. | |
| 2008/0198334 | A1 | 8/2008 | Kasazumi et al. | |

FOREIGN PATENT DOCUMENTS

| | | |
|---|---|---|
| CN | 1499236 A | 5/2004 |
| JP | A-2002-090881 | 3/2002 |
| JP | A-2002-277914 | 9/2002 |
| JP | A 2005-107150 | 4/2005 |
| JP | A-2006-018102 | 1/2006 |
| WO | WO 2005/062114 A1 | 7/2005 |
| WO | WO 2005/078519 A1 | 8/2005 |
| WO | WO 2006/098281 A1 | 9/2006 |

* cited by examiner

*Primary Examiner*—Seung C Sohn
(74) *Attorney, Agent, or Firm*—Oliff & Berridge, PLC

(57) ABSTRACT

A projector includes: a light source unit which supplies coherent light; a spatial light modulating unit which modulates the coherent light supplied from the light source unit according to an image signal; a projection optical system which projects light modulated by the spatial light modulating unit; and a light shifting unit disposed on an optical path of the projection optical system to shift light in a direction substantially perpendicular to an optical axis.

10 Claims, 6 Drawing Sheets

PROJECTOR THAT DISPLAYS AN IMAGE USING LASER BEAMS

BACKGROUND

1. Technical Field

The present invention relates to a projector, and more particularly to a technology of projector which displays an image using laser beams as coherent lights.

2. Related Art

When laser beams as coherent lights are applied to a diffusing surface, coherent patterns called speckle noise containing randomly distributed bright points and dark points appear in some cases. The speckle noise is generated by random coherences between diffused lights at respective points on the diffusing surface. The speckle noise recognized during display of an image has undesirable effect on the image to be displayed, since the audience is dazzled by flickering light produced by the speckle noise. For reducing the speckle noise, a technology which produces oscillation of a screen has been proposed in JP-A-2005-107150, for example. According to this technology, a particular speckle pattern becomes relatively inconspicuous by stacking a plurality of speckle patterns created by the oscillation of the screen.

According to a so-called front projection type projector, light is reflected by a screen and observed by the audience. Thus, this projector has an advantage that an image can be observed using various types of screen. However, in the structure which attains reduction of speckle noise based on the construction of the screen, speckle noise becomes conspicuous when a screen other than the dedicated screen is employed. According to the technology in the related art, therefore, it is difficult to reduce speckle noise without imposing any limitation on the types of screen or the like.

SUMMARY

It is an advantage of some aspects of the invention to provide a projector capable of reducing speckle noise and displaying a high-quality image without imposing any limitation on the types of screen or the like to be used.

A projector according to an aspect of the invention includes: a light source unit which supplies coherent light; a spatial light modulating unit which modulates the coherent light supplied from the light source unit according to an image signal; a projection optical system which projects light modulated by the spatial light modulating unit; and a light shifting unit disposed on an optical path of the projection optical system to shift the light in a direction substantially perpendicular to an optical axis.

The beam angle of light constituting pixels can be varied in a predetermined angle range by parallel shift of light using the light shifting unit. When light is shifted at a particular position on the projection optical system, only the bean angle can be varied without shift of the image formation position on a screen or the like. In this case, a particular speckle pattern becomes inconspicuous by changing speckle patterns according to variations of the beam angle. Thus, a high-quality image can be displayed with improvement over resolution decrease and reduction of speckle noise. This structure capable of reducing speckle noise by using the components contained in the projector can reduce speckle noise even when combined with an ordinary screen or the like having no particular structure for reducing the speckle noise. Accordingly, the projector in this aspect of the invention achieves speckle noise reduction and high-quality image display when used in combination with any types of screen.

According to this aspect of the invention, it is preferable that the projection optical system has a first optical element disposed on the entrance side into which light supplied from the spatial light modulating unit enters with respect to a stop, and a second optical element disposed on the exit side from which light supplied from the spatial light modulating unit leaves with respect to the stop. In this case, it is preferable that the light shifting unit is disposed between the first optical element and the second optical element. According to this structure, only the bean angle can be varied without shift of the image formation position on the screen or the like.

According to this aspect of the invention, it is preferable that the light shifting unit is disposed at the position of the stop or in the vicinity of the position of the stop. According to this structure, light can be shifted by using the compact light shifting unit.

According to this aspect of the invention, it is preferable that the light shifting unit has a transmission unit which transmits light. In this case, it is preferable that the transmission unit is rotatable around a rotation axis. The light incident angle with respect to the transmission unit can be varied in accordance with rotation of the transmission unit. Thus, shift of light can be achieved by utilizing the simple rotational movement of the transmission unit.

According to this aspect of the invention, it is preferable that the transmission unit has a plate shape. According to this structure, light can be easily and widely shifted.

According to this aspect of the invention, it is preferable that the light shifting unit has a polarization converting unit which sequentially converts polarization condition of entering light into first polarized light having a first oscillation direction and a second polarized light having a second oscillation direction substantially orthogonal to the first oscillation direction before the entering light exits. In this case, it is preferable that the first polarized light and the second polarized light supplied from the polarization converting unit are disposed at different positions in the direction substantially perpendicular to the optical axis at the time of exiting from the light shifting unit. Light can be easily controlled by converting the polarization condition. Thus, shift of light is easily and widely achievable by the simplified light control.

According to this aspect of the invention, it is preferable that the polarization converting unit has a liquid crystal element. According to this structure, the polarization condition of light can be easily converted.

According to this aspect of the invention, it is preferable that the light shifting unit has a double refraction unit having different refractive indexes for the first polarized light and for the second polarized light. The exiting positions of the first polarized light and the second polarized light can be disposed at different positions by using the double refraction element. Thus, the first polarized light and the second polarized light supplied from the polarization converting unit can be disposed at different positions in the direction substantially perpendicular to the optical path at the time of exiting from the light shifting unit.

According to this aspect of the invention, it is preferable that the projection optical system has a telecentric optical system. According to this structure, only the beam angle can be varied without shift of the image formation position on the screen or the like.

BRIEF DESCRIPTION OF THE DRAWINGS

The invention will be described with reference to the accompanying drawings, wherein like numbers refer to like elements.

DESCRIPTION OF EXEMPLARY EMBODIMENTS

Embodiments according to the invention are hereinafter described in detail with reference to the appended drawings.

First Embodiment

Figure 1:
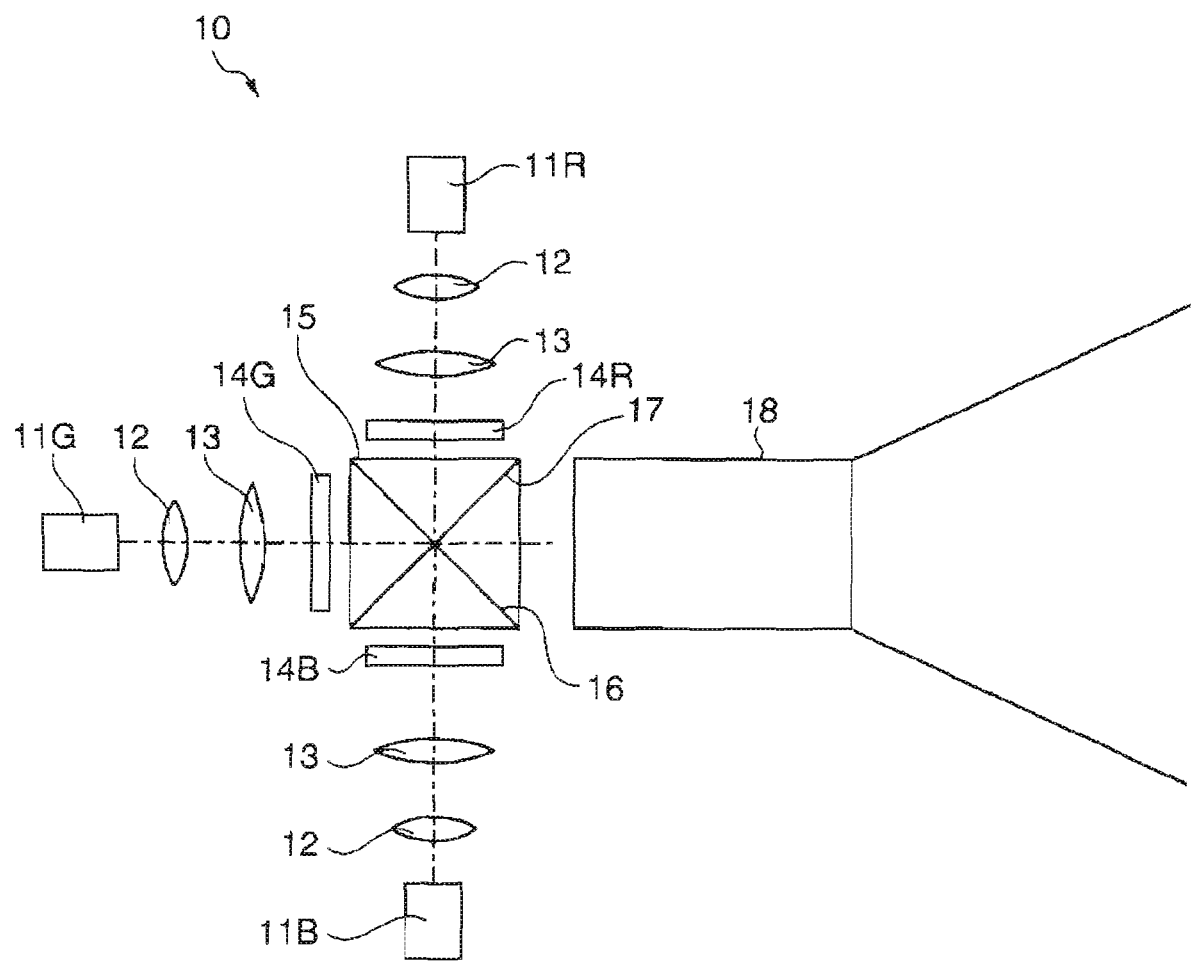
FIG. 1 schematically illustrates a structure of a projector according to a first embodiment of the invention.

FIG. 1 schematically illustrates a structure of a projector 10 according to a first embodiment of the invention. The projector 10 is a so-called front projection type projector which supplies light onto a screen 19 and displays an image to be observed created by the reflected light on the screen 19. Each of a light source unit 11R for red (R) light, a light source unit 11G for green (G) light, and a light source unit 11B for blue (B) light is a light source unit for supplying laser beam as coherent light.

The light source unit 11R for R light is a semiconductor laser for supplying laser beam of R light. A diffusion lens 12 diffuses the laser beam emitted from the light source unit 11R for R light. A field lens 13 collimates the laser beam diffused by the diffusion lens 12 and supplies the collimated laser beam to a spatial light modulating unit 14R for R light. The spatial light modulating unit 14R for R light is a spatial light modulating unit which modulates the R light emitted from the light source unit 11R for R light according to an image signal, and is constituted by a transmission type liquid crystal display unit which transmits R light in this embodiment. The transmission type liquid crystal display unit may be formed by a high temperature polysilicon (HTPS) TFT liquid crystal panel, for example. The R light modulated by the spatial light modulating unit 14R for R light enters a cross dichroic prism 15

The light source unit 11G for G light is a semiconductor laser for supplying laser beam of G light. The diffusion lens 12 diffuses the laser beam emitted from the light source unit 11G for G light. The field lens 13 collimates the laser beam diffused by the diffusion lens 12 and supplies the collimated laser beam to a spatial light modulating unit 14G for G light. The spatial light modulating unit 14G for G light is a spatial light modulating unit which modulates the G light emitted from the light source unit 11G for G light according to an image signal, and is constituted by a transmission type liquid crystal display unit which transmits G light in this embodiment. The G light modulated by the spatial light modulating unit 14G for G light enters the cross dichroic prism 15 from a side different from the side from which the R light enters.

The light source unit 11B for B light is a semiconductor laser for supplying laser beam of B light. The diffusion lens 12 diffuses the laser beam emitted from the light source unit 11B for B light. The field lens 13 collimates the laser beam diffused by the diffusion lens 12 and supplies the collimated laser beam to a spatial light modulating unit 14B for B light. The spatial light modulating unit 14B for B light is a spatial light modulating unit which modulates the B light emitted from the light source unit 11B for B light according to an image signal, and is constituted by a transmission type liquid crystal display unit which transmits B light in this embodiment. The B light modulated by the spatial light modulating unit 14B for B light enters the cross dichroic prism 15 from a side different from the sides from which the R light and G light enter.

The cross dichroic prism 15 has two dichroic films 16 and 17 so disposed as to cross each other substantially at right angles. The first dichroic film 16 reflects R light and transmits G light and B light. The second dichroic film 17 reflects B light and transmits R light and G light. The cross dichroic prism 15 synthesizes R light, G light and B light entering in different directions. A projection lens 18 is a projection optical system which projects light of respective colors synthesized by the cross dichroic prism 15 onto the screen 19.

Each of the light source units 11R, 11G and 11B may use plural semiconductor lasers. Each of the light source units 11R, 11G and 11B may include a wavelength converting element which converts wavelength of laser beam supplied from the semiconductor laser such as a second-harmonic generation (SHG) element. Each of the light source units 11R, 11G and 11B may use diode-pumped solid-state (DPSS) laser, solid laser, liquid laser, gas laser, and other types of laser, instead of the semiconductor laser.

The projector 10 may include an equalization optical system for equalizing distribution of light intensity such as a rod integrator, a fry-eye lens, and a superposing lens. The projector 10 may equalize distribution of light intensity in a rectangular lighting area provided for each of the spatial light modulating units 14R, 14G and 14B by using a diffraction optical element such as a computer generated hologram (CGH) element.

Figure 2A:
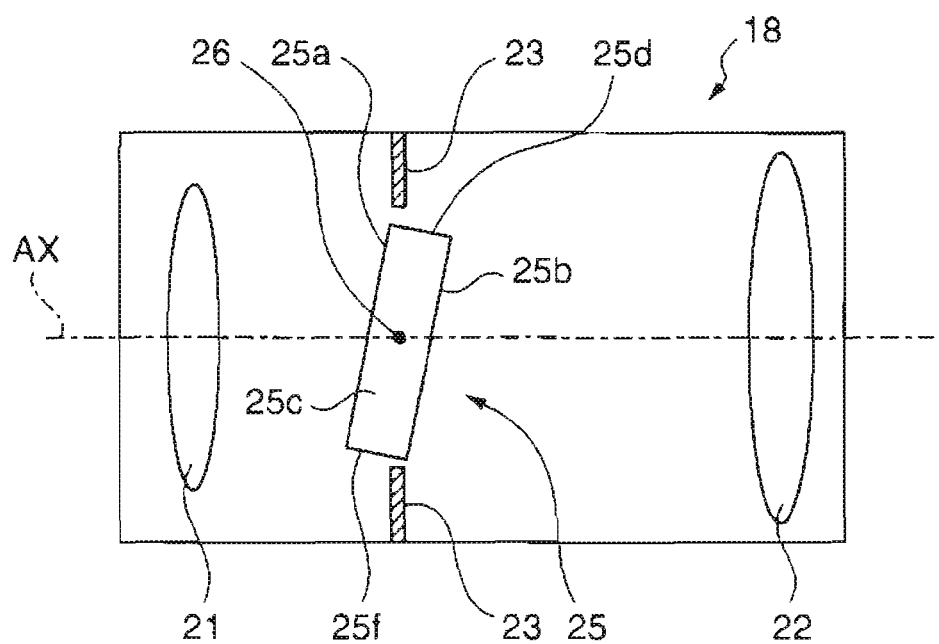
FIG. 2A schematically illustrates a structure of a projection lens.

FIG. 2A schematically illustrates the structure of the projection lens 18. The projection lens 18 has a front group lens 21 and a rear group lens 22. The front group lens 21 is a first optical element provided on the entrance side from which light supplied from the spatial light modulating unit enters with respect to a stop 23. The rear lens group 22 is a second optical element provided on the exit side from which light supplied from the spatial light modulating unit leaves with respect to the stop 23. Each of the front group lens 21 and the rear group lens 22 is not limited to a single lens but may be constituted by a plurality of lenses.

Figure 2B:
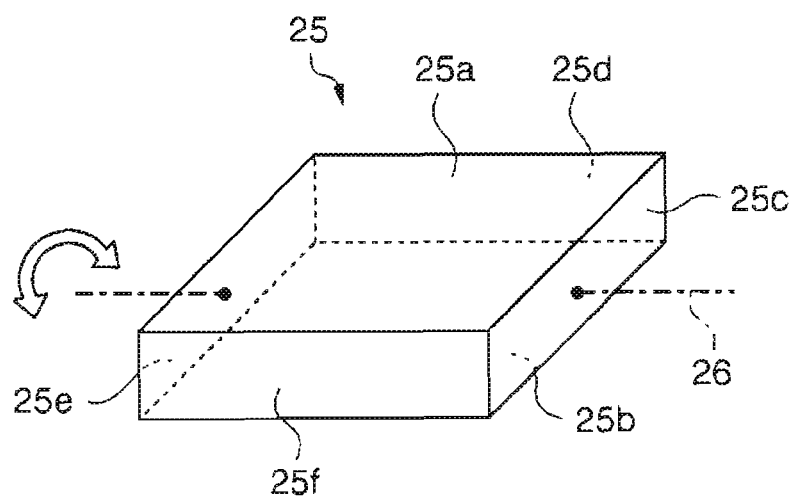
FIG. 2B is a perspective view schematically showing a structure of a transmission unit.

A transmission unit 25 is disposed at the position of the stop 23 on the optical path of the projection lens 18. The transmission unit 25 is a light shifting unit which achieves shift of light. The transmission unit 25 is made of transparent material such as glass so as to transmit light. As illustrated in FIG. 2B, the transmission unit 25 has a substantially flat plate shape. The transmission unit 25 has an entrance surface 25a into which the light modulated by the spatial light modulating unit enters, and an exit surface 25b from which the light modulated by the spatial light modulating unit leaves. Each of the entrance surface 25a and the exit surface 25b is substantially rectangular in the plan view. The transmission unit 25 has four end surfaces 25c through 25f each of which is substantially orthogonal to the entrance surface 25a and the exit surface 25b. The end surface 25c and the end surface 25e are disposed substantially parallel and opposed to each other. The end surface 25d and the end surface 25f are disposed substantially parallel and opposed to each other. The transmission unit 25 has a rotation axis 26. The rotation axis 26 is disposed in such a position as to pass through approximately the centers of the end surface 25c and the end surface 25e. The rotation axis 26 extends substantially in parallel with the entrance surface 25a and the exit surface 25b.

The rotation axis 26 is so provided as to cross an optical axis AX substantially at right angles. The transmission unit 25 is rotatable around the rotation axis 26. The transmission unit 25 reciprocatively rotates by electrostatic force generated according to potential difference, for example. Alternatively, the transmission unit 25 can be driven by electromagnetic force, by expanding force of a piezoelectric element, by driving force of a stepping motor rotating by predetermined step, or by other structures. It is also possible to use elastic force of an elastic body such as a spring together with these structures.

Figure 3:
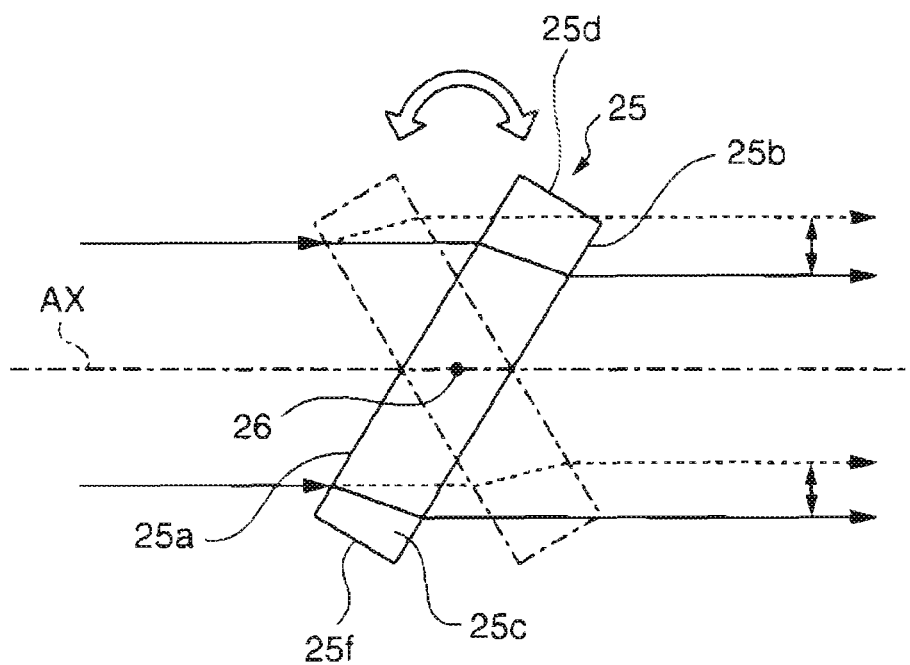
FIG. 3 shows shift of light caused by reciprocating rotation of the transmission unit.

FIG. 3 shows shift of light caused by reciprocating rotation of the transmission unit 25. The transmission unit 25 oscillates by its reciprocating rotation around the rotation axis 26 while varying inclination. When the transmission unit 25 is in a first inclined condition shown by a solid line in the figure, light having entered the transmission unit 25 is shifted from the position of entrance to the transmission unit 25 to a lower position in FIG. 3 due to refraction on the transmission unit 25 before leaving from the transmission unit 25. When the transmission unit 25 is in a second inclined condition shown by an alternate long and short dash line in the figure, light having entered the transmission unit 25 is shifted from the position of entrance to the transmission unit 25 to an upper position in FIG. 3 due to refraction on the transmission unit 25 before leaving from the transmission unit 25. Thus, the transmission unit 25 shifts light in the vertical direction as a direction substantially perpendicular to the optical axis AX, that is, to the upper position and lower position in FIG. 3 by varying light incident angle with respect to the transmission unit 25. The transmission unit 25 is not limited to the substantially rectangular shape in the plan view as in this embodiment, but may be other shapes which can shift entering light in a direction substantially perpendicular to the optical axis AX before the light exits. For example, the entrance surface 25a and the exit surface 25b may have substantially circular shapes in the plan view. The planar shapes of the entrance surface 25a and the exit surface 25b may be modified into arbitrary shapes other than circular shapes.

The transmission unit 25 repeatedly shifts light in the directions shown by a bi-directional arrow by oscillating such that the transmission unit 25 shifts between the first inclined condition and the second inclined condition. It is possible to oscillate the transmission unit 25 such that the transmission unit 25 shifts between a condition substantially perpendicular to the optical axis AX and a condition inclined with respect to the optical axis AX. In this case, light can be similarly shifted in a direction substantially perpendicular to the optical axis AX. According to this embodiment, the transmission unit 25 is rotatable around the depth direction with respect to the sheet surface of the figure, that is, around the rotation axis 26 passing through substantially the centers of the end surface 25c and the end surface 25e. However, the transmission unit 25 may rotate around the up-down direction in the figure, that is, around a rotation axis passing through substantially the centers of the end surface 25d and the end surface 25f. En this case, the transmission unit 25 shifts light in a horizontal direction as a direction substantially perpendicular to the optical axis AX, that is, to a deeper position and to a projecting position with respect to the sheet surface of FIG. 3.

Figure 4:
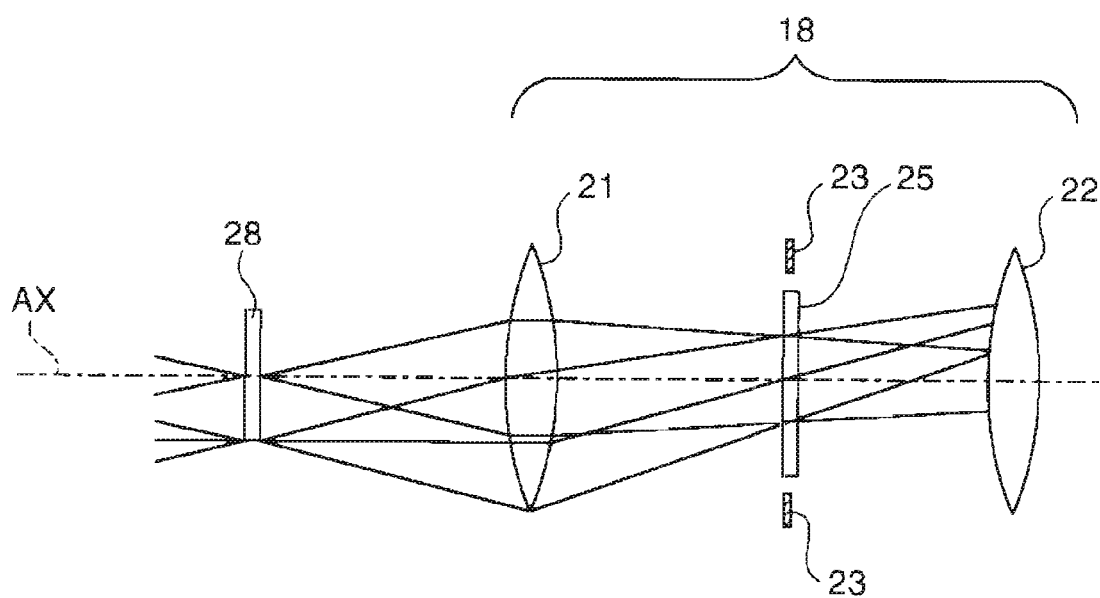
FIG. 4 shows arrangement of respective components of the projection lens.

FIG. 4 illustrates arrangement of respective components constituting the projection lens 18. The front group lens 21 is disposed such that the position of an image 28 of the spatial light modulating unit corresponds to the front focus and that the position of the stop 23 corresponds to the rear focus. The front group lens 21 constitutes a telecentric optical system where chief ray enters from the image 28 side of the spatial light modulating unit and travels substantially in parallel with the optical axis AX.

Figure 5:
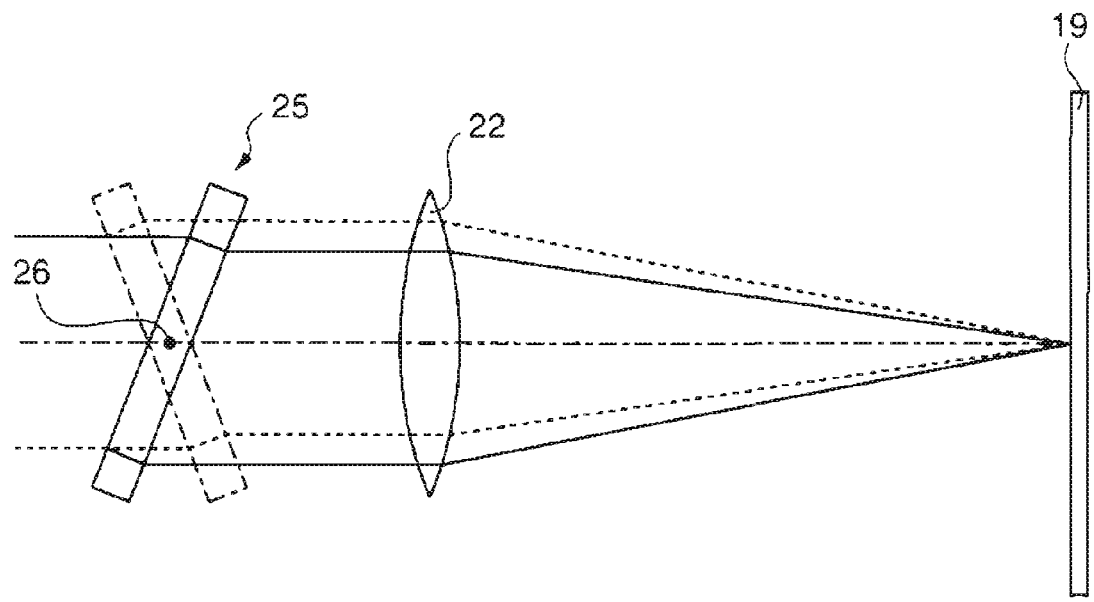
FIG. 5 shows arrangement of the transmission unit and a rear group lens.

FIG. 5 illustrates arrangement of the transmission unit 25 and the rear group lens 22. The rear group lens 22 is disposed such that the position of the screen 19 corresponds to the rear focus. The actions of lights exiting from the centers of the spatial light modulating units 14R, 14G and 14B (see FIG. 1) are now discussed. The respective lights exiting from the centers of the spatial light modulating units 14R, 14G and 14B are collimated by the front group lens 21 (see FIG. 4), and then enter the transmission unit 25.

The lights achieve parallel shift as shown by solid line and broken line by the oscillation of the transmission unit 25. Since the lights are collimated between the front group lens 21 and the rear group lens 22, only the beam angle can be varied without shift of the image formation position on the screen 19. In this case, a particular speckle pattern becomes inconspicuous by changing speckle patterns according to variations of the beam, angle. Thus, a high-quality image can be displayed with improvement over resolution decrease and reduction of speckle noise.

This structure capable of achieving reduction of speckle noise by using the components contained in the projector 10 can reduce speckle noise even when combined with an ordinary screen or the like having no particular structure for reducing the speckle noise. The structure therefore offers advantages of speckle noise reduction and high-quality image display when used in combination with any types of screen.

According to this embodiment, parallel shift of light can be easily and widely achieved in accordance with simple rotations of the transmission unit 25 which is rotatable and flat-plate-shaped. Thus, speckle patterns can be easily and effectively changed. The oscillation of the transmission unit 25 is not limited to periodical movement, but may be irregular movement. It is possible to effectively reduce the speckle noise when the beam angle is randomly varied according to irregular oscillation of the transmission unit 25. Since the irregular oscillation of the transmission unit 25 is allowable, the necessity for highly accurate control over the operation of the transmission unit 25 is eliminated. As a result, the structure for driving the transmission unit 25 is simplified. The transmission unit 25 preferably oscillates at such a speed that the sequentially varied speckle patterns cannot be recognized by the audience. In this case, a plurality of speckle patters can re stacked, and therefore speckle noise can be effectively reduced.

The size of the transmission unit 25 can be decreased by positioning the transmission unit 25 at the stop 23 where lights are gathered up. Thus, reduction of speckle noise can be achieved by a compact structure. Since the transmission unit 25 is small-sized, the transmission unit 25 can be driven by reduced power as a low power consumption type device. The position of the transmission unit 25 is not limited to the stop 23, but may be disposed in the vicinity of the stop 23. In case of the structure containing the transmission unit 25 positioned in the vicinity of the stop 23, the size of the transmission unit 25 can be similarly decreased. The transmission unit 25 may be disposed at any position on the optical path between the front group lens 21 and the rear group lens 22. When the transmission unit 25 is positioned at least between the front group lens 21 and the rear group lens 22, only the beam angle can be varied without shift of the image formation position.

The transmission unit 25 preferably oscillates at such a speed that the sequentially varied speckle patterns cannot be recognized by the audience. In this case, a plurality of speckle patterns can be stacked, and therefore the speckle noise can be effectively reduced. The F number of the projection lens 18 is preferably decreased to such an extent that light shifted by the oscillation of the transmission unit 25 can be more fully introduced than light not shifted by the transmission unit 25. In this case, light shifted by the oscillation of the transmission unit 25 can be sufficiently introduced. Accordingly, decrease in brightness of the image can be prevented by sufficient supply of light shifted by the transmission unit 5.

The projector 10 is not limited to the structure containing the spatial light modulating unit for each of R light, G light and B light, but may be a structure having a single spatial light modulating unit which modulates lights of two or three colors. The projector 10 is not limited to the structure including the transmission type liquid crystal display unit as the spatial light modulating unit. The spatial light modulating unit may be constituted by reflection type liquid crystal display unit (liquid crystal on silicon; LCOS), DMD (digital micromirror devices, GLV (grating light valve), or other devices.

Second Embodiment

Figure 6:
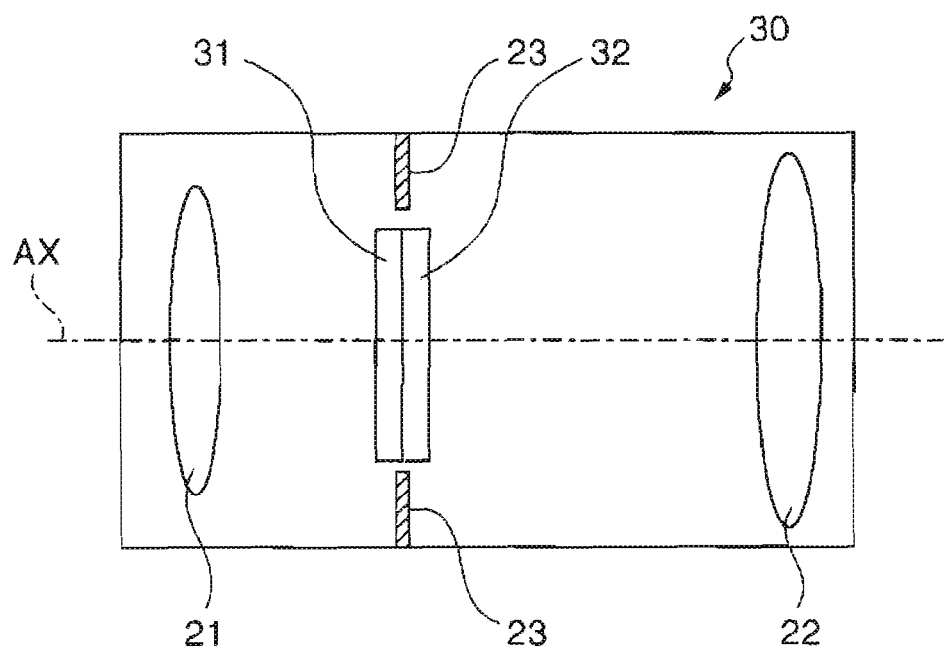
FIG. 6 schematically illustrates a structure of a projection lens according to a second embodiment of the invention.

FIG. 6 schematically illustrates a projection lens 30 according to a second embodiment of the invention. A projection lens 30 in this embodiment can be used in the projector 10 in the first embodiment. The projection lens 30 in this embodiment has a liquid crystal element 31 and a double refraction element 32 in lieu of the transmission unit 25. Similar reference numbers are given to components and parts similar to those in the first embodiment, and the same explanation is not repeated. The liquid crystal element 31 and the double refraction element 32 constitute a light shifting unit provided on the optical path of the projection lens 30.

The liquid crystal element 31 and the double refraction element 32 are disposed at the position of the stop 23. The liquid crystal element 31 has liquid crystal molecules dispersed in a parallel plate. The liquid crystal element 31 is a polarization converting unit which sequentially converts the polarization condition of entering light into p-polarized light and s-polarized light according to the orientation condition of the liquid crystal molecules before the entering light exits. The p-polarized light is a first polarized light having a first oscillation direction. The s-polarized light is a second polarized light having a second oscillation direction substantially orthogonal to the first oscillation direction. A not-shown transparent electrode is provided on each of the entrance side and exit side of the liquid crystal element 31. The transparent electrode is made of ITO or IZO as metal oxide, for example. The orientation condition of the liquid crystal molecules can be varied by supply or stop of voltage to the transparent electrodes.

Figure 7:
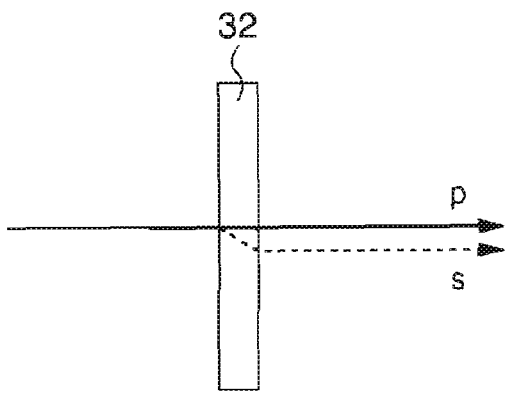
FIG. 7 shows a double refraction element.

The double refraction element 32 is disposed on the exit side of the liquid crystal element 31. The double refraction element 32 has a substantially flat and parallel plate shape similarly to the liquid crystal element 31. The double refraction element 32 has different refractive indexes for the p-polarized light as the first polarized light and for the s-polarized light as the second polarized light. Thus, as illustrated in FIG. 7, the double refraction element 32 transmits p-polarized light component of the entering light without change and refracts s-polarized light component of the entering light, for example. Thus, the double refraction element 32 achieves parallel shift of s-polarized light from p-polarized light. The double refraction element 32 is made of crystal or calcite, for example.

Figure 8:
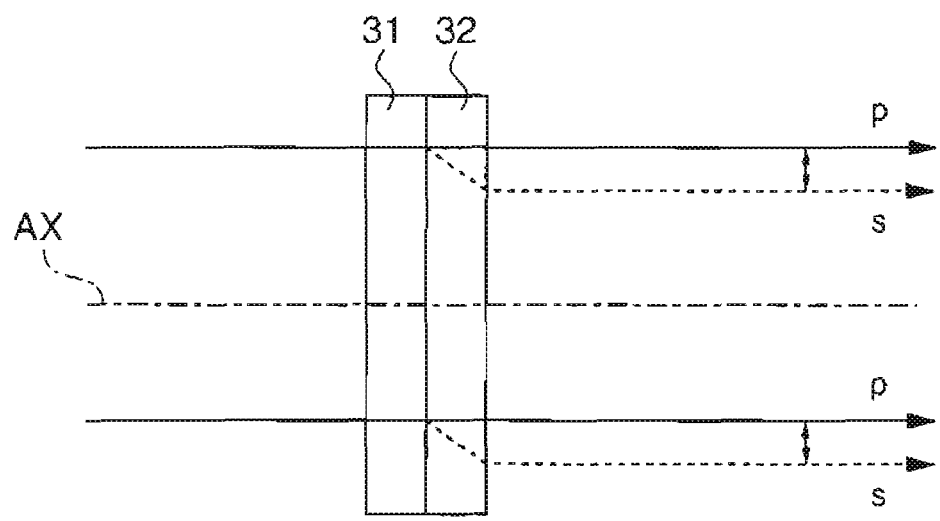
FIG. 8 shows shift of light produced by a liquid crystal element and the double refraction element.

FIG. 8 illustrates shift of light produced by using the liquid crystal element 31 and the double refraction element 32. It is assumed that the spatial light modulating units 14R, 14G and 14B supply particular linear polarized light such as p-polarized light according to an image signal. When the liquid crystal element 31 transmits p-polarized light without change, the p-polarized light exiting from the liquid crystal element 31 travels straight through the double refraction element 32. When the liquid crystal element 31 converts p-polarized light into s-polarized light, the s-polarized light exiting from the liquid crystal element 31 is shifted in a direction substantially perpendicular to the optical axis AX by the refraction on the double refraction element 32. Thus, the p-polarized light and s-polarized light supplied from the liquid crystal element 31 are disposed at different positions in the direction substantially perpendicular to the optical path AX at the time of exiting from the double refraction element 32.

According to this embodiment, the structure can achieve reduction of speckle noise even when combined with an ordinary screen or the like having no particular construction for reducing speckle noise similarly to the case of the first embodiment. This structure therefore offers advantages of speckle noise reduction and high-quality image display when used in combination with any types of screen. Since the liquid crystal element 31 is used, the polarization condition of light can be easily converted by voltage control. As a result, light control is simplified, and therefore shift of light can be easily and widely achieved. When s-polarized lights in accordance with image signals exit the spatial light modulating units 14R, 14G and 14B, the liquid crystal element 31 is so constructed as to transmit s-polarized light and convert s-polarized light into p-polarized light.

While the front projection type projector 10 has been discussed in these embodiments, the projector according to another embodiment of the invention may be a so-called rear projector which supplies light onto one surface of a screen and displays an image to be observed produced by light exits from the other surface of the screen.

As described above, the projector according to any of the embodiments of the invention is appropriately used when an image is displayed using laser beams.

The entire disclose of Japanese Patent Application NO. 2006-308726, filed Nov. 15, 2007 is expressly incorporated by reference herein.

What is claimed is:

1. A projector, comprising:
   a light source unit which supplies coherent light;
   a spatial light modulating unit which modulates the coherent light supplied from the light source unit according to an image signal;
   a projection optical system which projects light modulated by the spatial light modulating unit; and
   a light shifting unit disposed on an optical path of the projection optical system to shift the light modulated by the spatial light modulating unit in a direction substantially perpendicular to a local optical axis of the projection optical system.

2. The projector according to claim 1, wherein:
   the projection optical system has a first optical element disposed on an entrance side of the projection optical system into which light supplied from the spatial light modulating unit enters with respect to a position of a stop located within the projection optical system, and a second optical element disposed on an exit side of the projection optical system from which light supplied from the spatial light modulating unit leaves with respect to the stop; and the light shifting unit is disposed between the first optical element and the second optical element.

3. The projector according to claim 2, wherein the light shifting unit is disposed at the position of the stop or in a vicinity of the position of the stop.

4. The projector according to claim 1, wherein:

the light shifting unit has a transmission unit which transmits light; and the transmission unit is rotatable around a rotation axis.

5. The projector according to claim 4, wherein the transmission unit has a plate shape.

6. The projector according to claim 1, wherein:

the light shifting unit has a polarization converting unit which sequentially converts polarization condition of entering light having an initial oscillation direction into a first polarized light having a first oscillation direction and a second polarized light having a second oscillation direction substantially orthogonal to the first oscillation direction before the entering light exits, one of the first and second oscillation directions being the same as the initial oscillation direction.

7. The projector according to claim 6, wherein the polarization converting unit has a liquid crystal element.

8. The projector according to claim 6, wherein the light shifting unit has a double refraction unit having different refractive indexes for the first polarized light and for the second polarized light.

9. The projector according to claim 1, wherein the projection optical system has a telecentric optical system.

10. A projector, comprising:

a light source unit which supplies coherent light;

a spatial light modulating unit which modulates the coherent light supplied from the light source unit according to an image signal;

a projection optical system, whereby light modulated by the spatial light modulating unit is projected on a screen;

a first optical element disposed in an entrance side of the projection optical system into which light supplied from the spatial light modulating unit enters with respect to a position of a stop located within the projection optical system, the first optical element being disposed such that a position of an image of the spatial light modulating unit corresponds to a front focus of the first optical element and that the position of the stop corresponds to a rear focus of the first optical element;

a second optical element disposed in an exit side of the projection optical system from which light supplied from the spatial light modulating unit leaves with respect to the position of the stop, the second optical element being disposed such that a position of the screen corresponds to a rear focus of the second optical element; and a light shifting unit disposed between the first optical element and the second optical element, the light shifting unit including a polarization converting unit which sequentially converts a polarization condition of the entering light modulated by the spatial light modulating unit having an initial oscillation direction into a first polarized light having a first oscillation direction and a second polarized light having a second oscillation direction substantially orthogonal to the first oscillation direction before the entering light exits, one of the first and second oscillation directions being the same as the initial oscillation direction.

* * * * *